US010551718B2

(12) United States Patent
Arita et al.

(10) Patent No.: US 10,551,718 B2
(45) Date of Patent: Feb. 4, 2020

(54) DISPLAY HAVING HOUSING WITH CURVED PART

(71) Applicant: Mitsubishi Electric Corporation, Tokyo (JP)

(72) Inventors: Kenji Arita, Tokyo (JP); Takashi Miyayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/933,883

(22) Filed: Mar. 23, 2018

(65) Prior Publication Data

US 2018/0284564 A1    Oct. 4, 2018

(30) Foreign Application Priority Data

Apr. 4, 2017   (JP) ................. 2017-074504

(51) Int. Cl.
| | | |
|---|---|---|
| G09G 5/00 | (2006.01) | |
| G02F 1/35 | (2006.01) | |
| G02F 1/1335 | (2006.01) | |
| G02F 1/1333 | (2006.01) | |
| G02F 1/1339 | (2006.01) | |
| G02F 1/1362 | (2006.01) | |

(52) U.S. Cl.
CPC .......... *G02F 1/3501* (2013.01); *G02F 1/1339* (2013.01); *G02F 1/13338* (2013.01); *G02F 1/133512* (2013.01); *G02F 1/136286* (2013.01); *G02F 2001/3505* (2013.01)

(58) Field of Classification Search
CPC ...... G06F 3/041; G06F 3/0412; G06F 3/0416; G06F 3/044; G06F 2203/04103; G06F 2203/04107; G06F 2203/04112
See application file for complete search history.

(56) References Cited

U.S. PATENT DOCUMENTS

| | | | | |
|---|---|---|---|---|
| 9,341,875 | B2 * | 5/2016 | Akatsuka | .......... G02F 1/133308 |
| 9,411,455 | B2 * | 8/2016 | Yoshikawa | ....... G02F 1/133308 |
| 9,690,040 | B2 * | 6/2017 | Poorter | ............ G02F 1/133308 |
| 10,036,845 | B2 * | 7/2018 | Ha | ........................ G02B 6/0036 |
| 10,216,022 | B2 * | 2/2019 | Arita | ..................... G06F 1/1601 |
| 2015/0022753 | A1 * | 1/2015 | Akatsuka | .......... G02F 1/133308 |
| | | | | 349/58 |
| 2015/0253495 | A1 * | 9/2015 | Matsumoto | ............. G06F 3/044 |
| | | | | 345/174 |
| 2016/0363715 | A1 * | 12/2016 | Ha | ........................ G02B 6/0036 |
| 2018/0113352 | A1 * | 4/2018 | Arita | ..................... G06F 1/1601 |

FOREIGN PATENT DOCUMENTS

| | | |
|---|---|---|
| JP | 2013-134295 A | 7/2013 |
| JP | 2017-003972 A | 1/2017 |

* cited by examiner

*Primary Examiner* — Vijay Shankar
(74) *Attorney, Agent, or Firm* — Studebaker & Brackett PC (57) ABSTRACT

A protection member is disposed on a curved part of a housing having a desired curvature between a first display panel and a second display panel, thus the protection member is deformed along with the curvature of the curved part and curved. The curvature of the curved part formed in the housing has a plurality of curvatures.

6 Claims, 7 Drawing Sheets

DISPLAY HAVING HOUSING WITH CURVED PART

BACKGROUND OF THE INVENTION

Field of the Invention

The present invention relates to a display including a display panel to display an image.

Description of the Background Art

A liquid crystal display (LCD) as a display is widely applied to a variety of uses in accordance with its advantages such as lightweight properties and thinness, and is also used in a central information display and a meter display of a vehicle, for example.

Since a general display panel has a planar shape, it can be used only in a limited space when being used as a display for a vehicle, so that it has problems that a display having a large size of display screen cannot be used or a restriction needs to be placed on an interior design of the vehicle, thereby having a problem of affecting designability in an interior of the vehicle.

Recently, a demand for an installation of a curved display panel increases, thus a liquid crystal display as described in Japanese Patent Application Laid-Open No. 2013-134295 or Japanese Patent Application Laid-Open No. 2017-3972 is devised.

A display whose curvature is controlled with high accuracy is used to incorporate the curved display panel in the vehicle, for example, in some cases. A display which does not have a single curvature but has a combination of a plurality of curvatures is required for the interior of the vehicle. A display which does not affect designability in the interior is required even when the display has the plurality of curvatures.

SUMMARY

It is an object of the present invention to obtain a display having a configuration that a plurality of curvatures are combined.

A display of the present invention includes at least one display panel displaying an image, a protection member holding the at least one display panel from a side of a front surface, and a housing supporting the protection member, wherein the housing has a frame and a curved part having a plurality of curvatures, and the protection member is attached and fixed to a position facing the curved part of the housing. The display includes a support member having a curved surface corresponding to the curved part of the housing, wherein the protection member is disposed between the support member and the curved part of the housing.

According to the display of the present invention, the protection member is held by the housing including the curved part, thus the display having the desired curvature can be configured. The support member having the curved surface corresponding to the curved part of the housing is disposed, and the protection member is sandwiched by the housing to maintain the shape, thus the protection member can be prevented from leaving and being peeled from the housing, and a loss of designability in the display device can be prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

A display according to an embodiment of the present invention is described hereinafter based on the drawings. In the description hereinafter, constituent elements to which the same sign are applied indicate the same or substantially the same constituent element. Accordingly, a detailed description thereof may be omitted in some cases. A size, a material, a shape, and an arrangement position, for example, of each constituent element described in the present embodiment are appropriately changed in accordance with a configuration of an apparatus to which the present invention is applied and various conditions, thus are not limited to the description in the present embodiment.

Embodiment

Figure 1A:
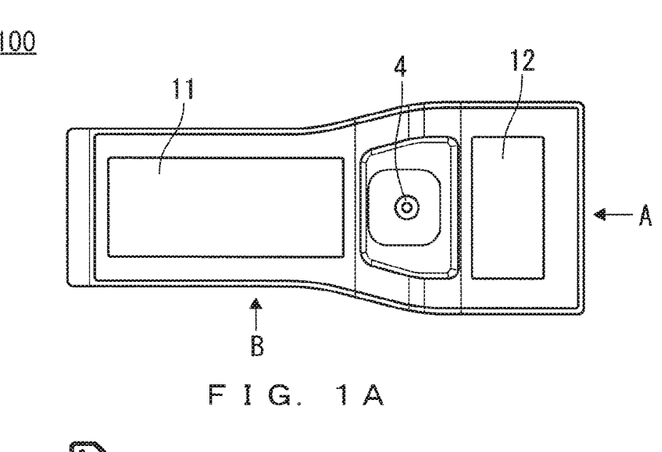
FIG. 1A is a planar view of a display according to an embodiment seen from a direction of display surface.
Figure 1B:
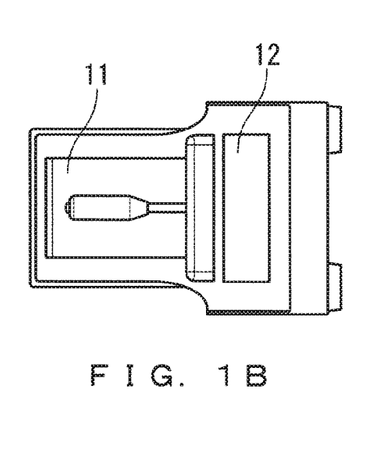
FIG. 1B is a side view of the display according to the embodiment.
Figure 1C:
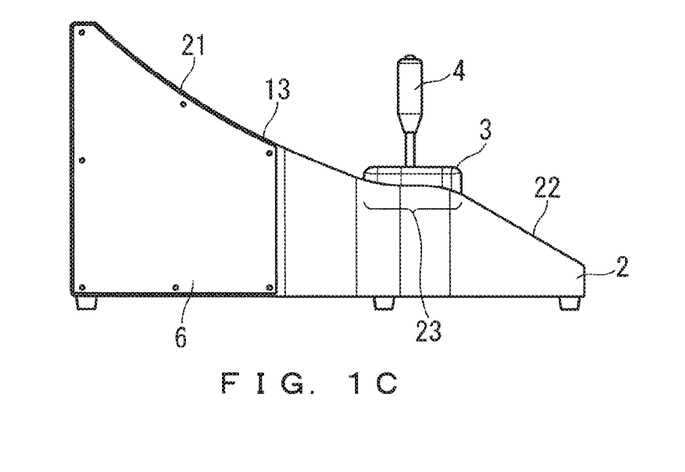
FIG. 1C is a side view of the display according to the embodiment.
Figure 2:
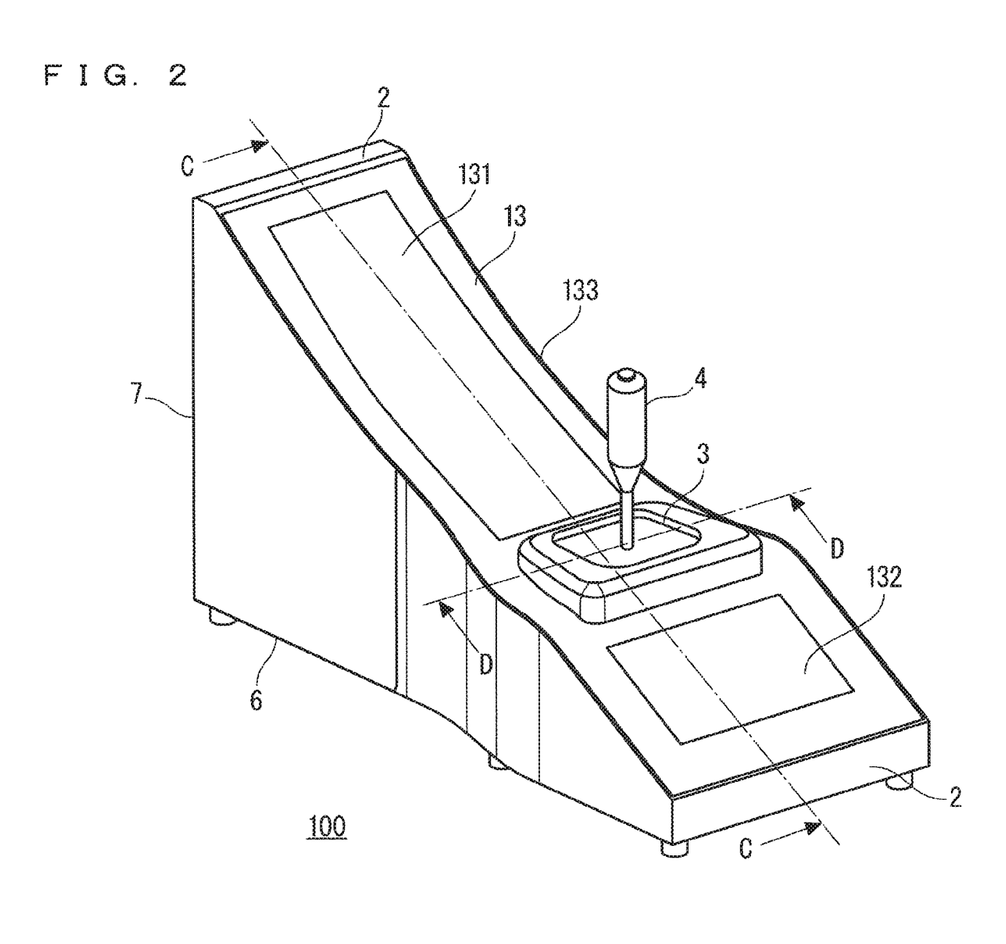
FIG. 2 is a perspective view of the display according to the embodiment.
Figure 3:
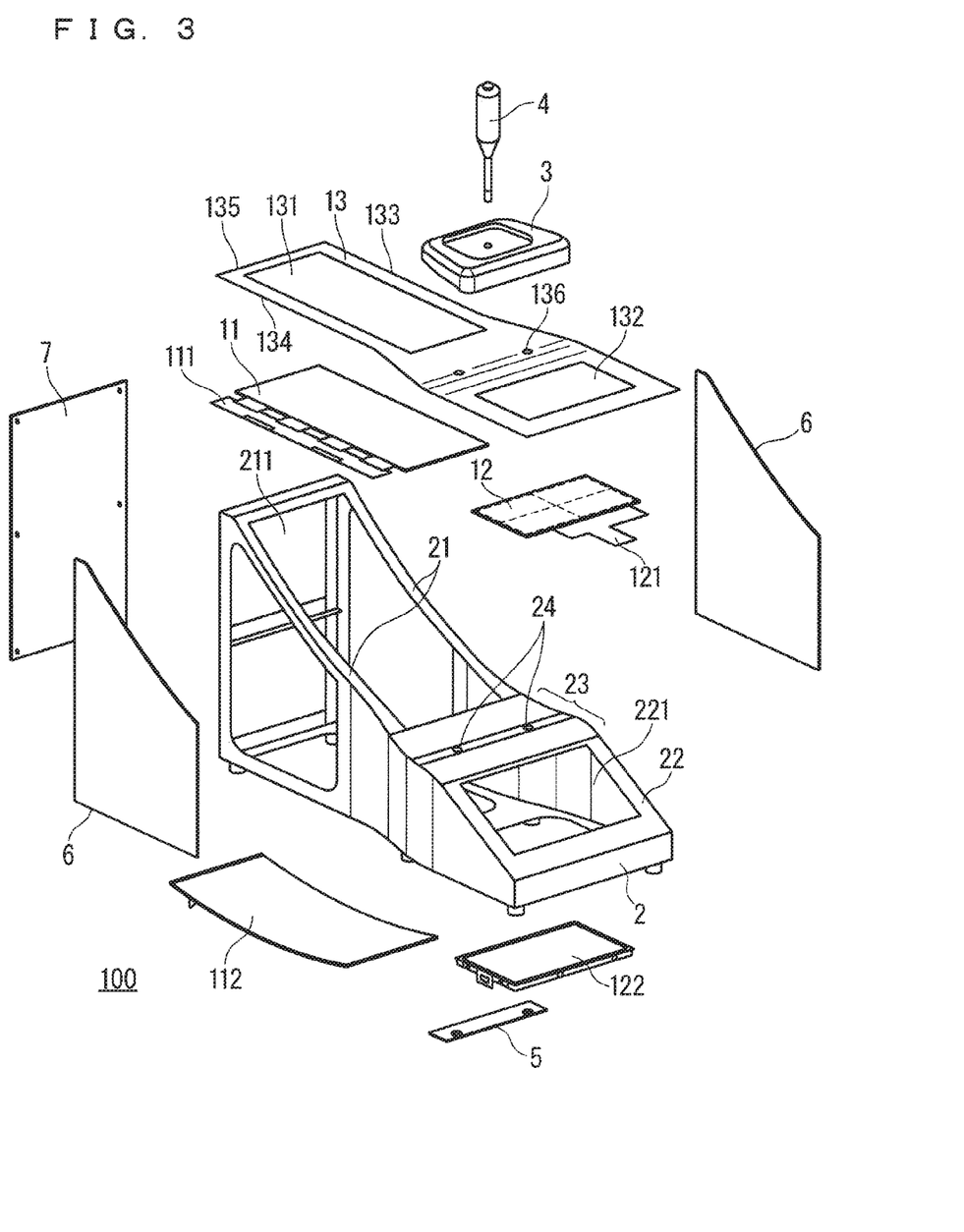
FIG. 3 is an exploded perspective view of the display according to the embodiment.
Figure 4:
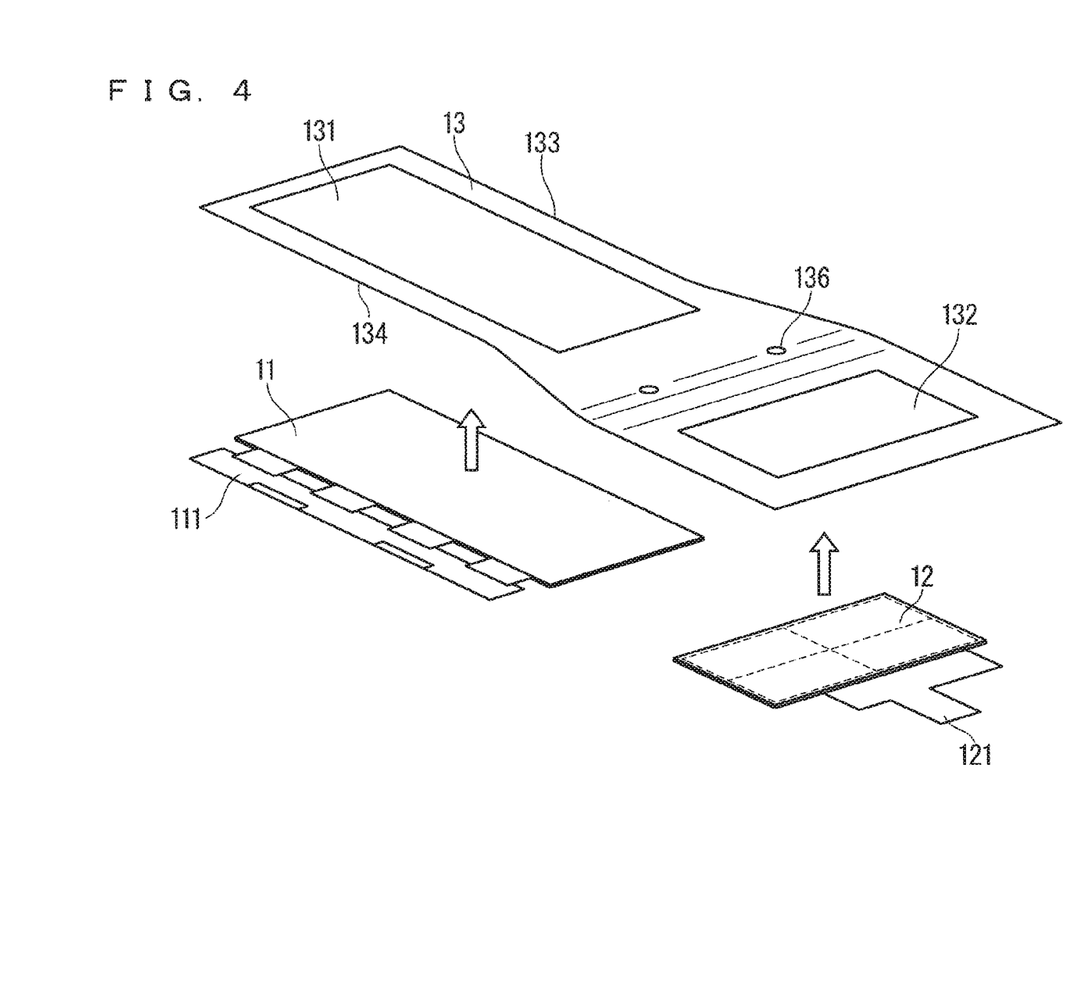
FIG. 4 is a perspective view of a main part of the display according to the embodiment.
Figure 5:
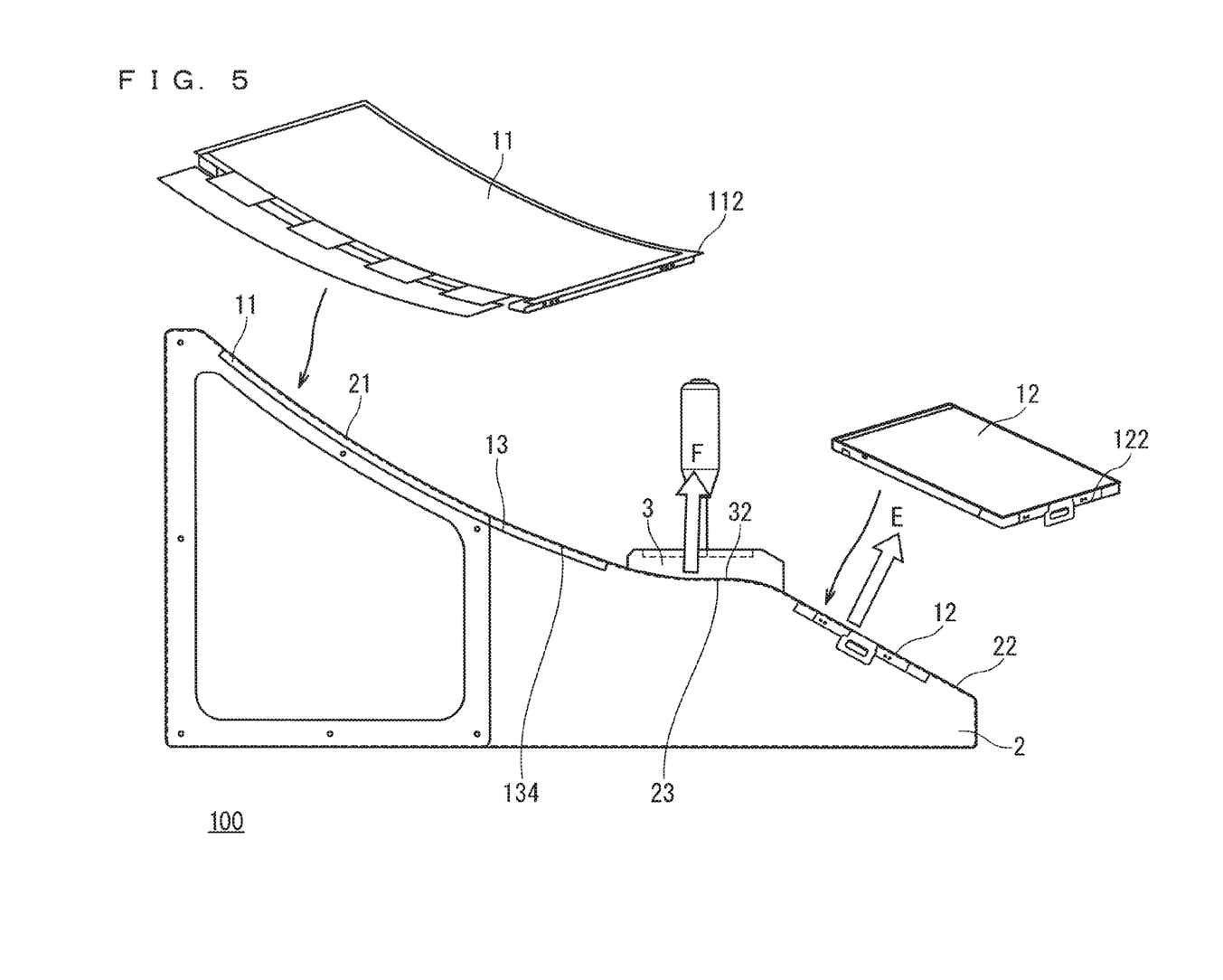
FIG. 5 is a cross-sectional view of the display according to the embodiment.
Figure 6:
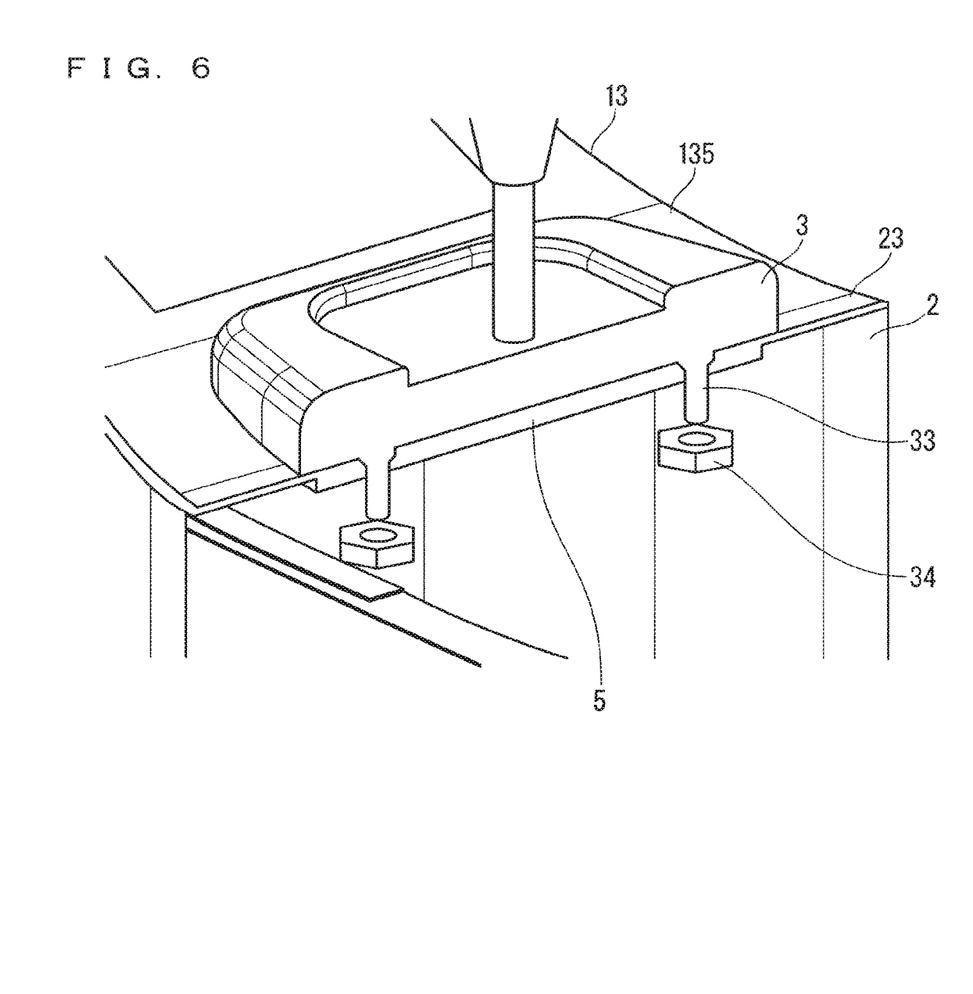
FIG. 6 is a cross-sectional perspective view of the display according to the embodiment.
Figure 7:
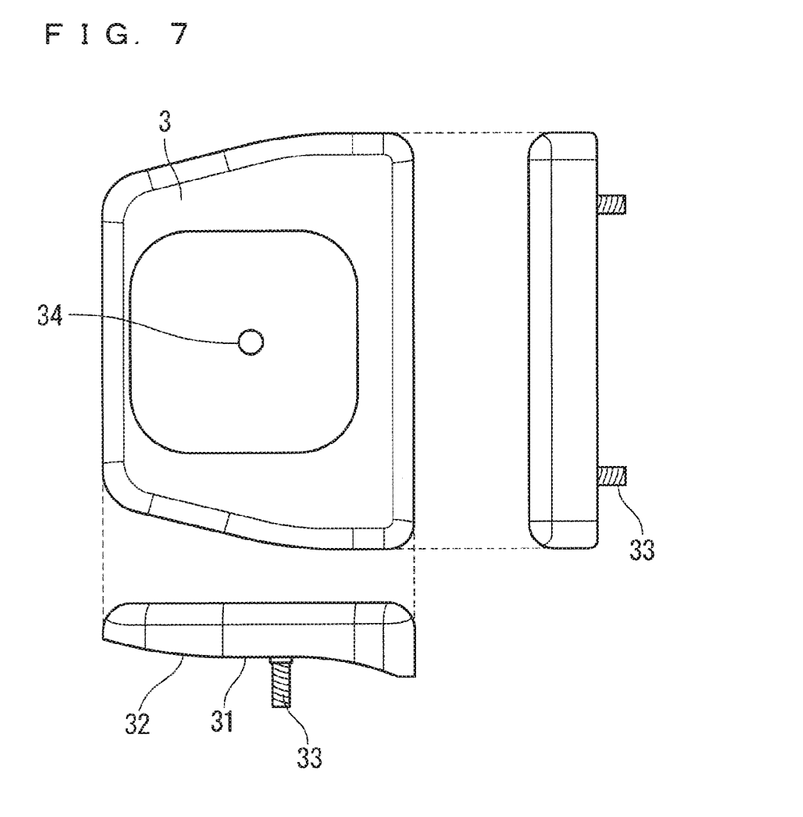
FIG. 7 is a three-plane drawing of a support member which is a constituent member of the display according to the embodiment.

FIG. 1A is a planar view of a display 100 according to the embodiment of the present invention seen from a direction of display surface, FIG. 1B is a side view of the display 100 illustrated in FIG. 1A seen from a direction of arrow A, and FIG. 1C is a side view of the display 100 illustrated in FIG. 1A seen from a direction of arrow B. FIG. 2 is a perspective view of the display 100 according to the present embodiment, and FIG. 3 is an exploded perspective view of the display 100 according to the present embodiment. FIG. 4 is a perspective view of a main part of the display of the present invention, FIG. 5 is a cross-sectional view taken along a line C-C in FIG. 2, and FIG. 6 is a cross-sectional perspective view taken along a line D-D in FIG. 2. FIG. 7 is a three-plane drawing of a support member which is a constituent member of the display 100.

<Whole Configuration>

A structure of the display 100 according to the present embodiment is described. As illustrated in FIG. 1A to FIG. 5, the display 100 according to the present embodiment includes a plurality of display panels of a first display panel 11 and a second display panel 12 for displaying an image. Wiring substrates 111 and 121 are connected to the first display panel 11 and the second display panel 12 to input a signal from outside. Backlights 112 and 122 are disposed on back surfaces of the first display panel 11 and the second display panel 12, respectively, to irradiate the display panels with light. A protection member 13 is disposed on a side of front surfaces (a side of display surfaces) of the display panels to protect the first display panel 11 and the second display panel 12 and to enhance a design of the display 100. The protection member 13 is a plate-like glass, and display region 131 in the first display panel 11 and a display region 132 in the display panel 12 are formed. A light-shielding member for shielding light is disposed on a peripheral region 133 except for the display regions 131 and 132. The first display panel 11 and the second display panel 12 are attached and fixed to a back surface 134 of the protection member 13 having the above configuration with a transparent adhesive member (not shown in the drawings) therebetween.

The protection member 13 is fixed to frames 21 and 22 of a housing 2 and a curved part 23 (described hereinafter) formed between the display panels, and has a support member 3 disposed opposite to the curved part 23 of the housing 2. A housing side surface cover 6 and a housing back surface cover 7 are disposed on a side surface and a back surface of the housing 2, respectively, to constitute the display 100. Shapes of the protection member 13 and whole display of the present embodiment are based on an assumption of a shape of simulating an interior design of the vehicle, thus when the protection member 13 and the whole display are adopted to a real vehicle, the shapes can be appropriately changed in accordance with the interior design.

The housing 2 has an opening part 211 in a region where at least the first display panel 11 is disposed and the frame 21 forming the opening part 211. The housing 2 has an opening part 221 in a region where the second display panel 12 is disposed and the frame 22 forming the opening part 221. A frame of the housing 2 formed between the first display panel 11 and the second display panel 12 forms the curved part 23 having a desired curvature. The protection member 13 is a plate-like glass in a cross-sectional view, to which the display panels 11 and 12 are fixed, and is attached and fixed to the frames 21 and 22 and the curved part 23 of the housing 2 from a side of the back surface 134 with an adhesive member such as a double-faced tape (not shown in the drawings). The shapes of the protection member 13 and the housing 2 can be changed in accordance with a use application and a design of the display 100, thus when the first display panel 11 has the curved surface as the present embodiment or when the first display panel 11 is deformed to have the curved surface, the frame 21 of the housing 2 holding the first display panel 11 is formed to have the curved surface. Since the second display panel 12 has a planar surface, the frame 22 of the housing 2 holding the second display panel 12 is formed to have the planar surface. As described above, the shape of the frame 22 of the housing 2 is appropriately changed along with the shape of the display surface of the display panel to be held, and the shape of the protection member 13 is also changed along with the shape of the housing 2. The display 100 described in the present embodiment has the configuration that the two display panels are disposed on the one protection member 13, however, a plurality of display panels may also be mounted, and also as a combination of the shape of the display panel, any of a combination of the display panel having the curved surface and a combination of the display panel having the planar surface may be applicable.

The protection member 13 is disposed on the curved part 23 of the housing 2 having the desired curvature between the first display panel 11 and the second display panel 12, thus the protection member 13 is deformed along with the curvature of the curved part 23 and curved. The curvature of the curved part 23 formed in the housing 2 of the present embodiment has a plurality of curvatures. When the curved part 23 has the plurality of curvatures, as illustrated in FIG. 1C or FIG. 5, the curved part 23 has the curvatures along with the display surface of the first display panel 11 and the display surface of the second display panel 12 and the curvature being set between the two display panels.

As described above, the protection member 13 is fixed to the housing 2 from the side of the back surface 134 with the double-faced tape therebetween, and when the protection member 13 is fixed to the curved part 23 having the desired curvature, as illustrated in FIG. 5, a stress (a restoring force) as indicated by an arrow E is applied to the protection member 13 on the curved part 23 so that the protection member 13 is to be restored to its initial shape (the planar surface). When the protection member 13 is securely fixed to the frames 21 and 22, a force as indicated by an arrow F is applied in the curved part 23 so that the protection member 13 is to be restored to have a certain curvature, and a stress is applied to the protection member 13 in a direction that the protection member 13 leaves the curved part 23. Since the stress is concentrated in a direction that the protection member 13 is peeled from the curved part 23 of the housing 2 due to the stress, a defect that the protection member 13 is peeled from the housing 2 may occur.

Accordingly, the display 100 of the present embodiment has the support member 3 disposed opposite to the curved part 23 of the housing 2. As illustrated in FIG. 5 to FIG. 7, the support member 3 has a curved surface 32 on a rear surface 31 corresponding to the curved part 23 of the housing 2, and a curvature of the curved surface 32 corresponds to the curved part 23 of the housing 2.

The support member 3 is disposed on a side of a front surface 135 of the protection member 13, and is disposed on the curved part 23 of the housing 2 with the protection member 13 therebetween. According to such a configuration, the curved surface 32 formed in the rear surface 31 of the support member 3 and the curved part 23 of the housing 2 are disposed to sandwich the protection member 13 therebetween, thereby maintaining the curvature of the protection member 13.

As illustrated in FIG. 6 and FIG. 7, at least one screw part 33 protruding from the rear surface 31 toward the housing 2 is formed on the support member 3. In the present embodiment, two screw parts 33 are formed on the support member 3. As illustrated in FIG. 3, through holes 24 into which the screw parts 33 are inserted are provided in the curved part 23 of the housing 2 on which the curved surface 32 is disposed in a position corresponding to the screw parts 33 of the support member 3. Through holes 136 for fitting the screw parts 33 are also provided in the protection member 13 to correspond to the through holes 24 for fitting the screw parts 33. According to such a configuration, when the support member 3 is disposed from the side of the front surface 135 of the protection member 13 disposed on the housing 2, the screw parts 33 are inserted into the through holes 136 of the protection member 13 and the through holes 24 of the housing 2, and then fixed with fixing nuts 34 fitting with the screw parts 33 of the support member 3 from a side of a rear surface of the housing 2. A support plate 5 is disposed on the rear surface of the housing 2 on which the fixing nuts 34 are disposed, thereby being capable of reducing a stress applied to the housing 2 and the protection member 13.

The configuration described above can prevent the stress (the restoring force) to restore the protection member 13 to its initial shape (the planar surface) on the curved part 23. When the protection member 13 is securely fixed to the frames 21 and 22, the configuration described above can prevent the force of restoring the protection member 13 to have a certain curvature.

As described above, the display 100 of the present embodiment includes the curved part 23 having the plurality of curvatures in the housing 2 and places the protection member 13 holding the display panels, thereby being capable of having the desired curvature, thus the display 100 having the combination of the plurality of curvatures can be obtained. Moreover, the support member 3 having the curved surface 32 corresponding to the curved part 23 of the housing 2 is disposed, and the protection member 13 is sandwiched by the housing 2 to maintain the shape, thus the stress applied to the protection member 13 can be prevented, the stress of restoring the protection member 13 to its initial shape can be prevented, and the curvature of the protection member 13 can be maintained. Accordingly, the protection member 13 can be prevented from leaving and being peeled from the housing 2, thus the display 100 which does not affect designability in the interior can be configured even when the display 100 has the plurality of curvatures.

Since the screw parts 33 of the support member 3 are fitted into the through holes 24 of the housing 2 and the through holes 136 of the protection member 13 to hold the protection member 13, the stress applied to the protection member 13 can be prevented more securely.

Moreover, the curvature of the protection member 13 is set by the curved part 23, thus the plurality of display panels can be set to have predetermined display directions.

<Modification Example>

In the protection member 13, a thickness in a region disposed on the curved part 23 of the housing 2 may be smaller than that of the other part. The protection member 13 can be curved easily by making the region disposed on the curved part 23 thinner than the other part, thus the plurality of curvatures can be formed easily. The curved part 23 is preferably formed to have a thickness approximately 75% of the other part of the protection member 13.

A method of manufacturing the display of the present embodiment is described hereinafter. As illustrated in FIG. 4, the first display panel 11 and the second display panel 12 are attached to the protection member 13 with a transparent adhesive member (not shown in the drawings) using a vacuum apparatus.

As illustrated in FIG. 5, the backlights 112 and 122 for irradiating the display panels 11 and 12, respectively, constitute a flange structure, and the double-faced tape is attached to a surface of the flange structure facing the protection member 13 to fix the flange structure to the side of the back surface 134 of the protection member 13 with the double-faced tape.

After the display panels and the backlights are disposed on the protection member 13, as illustrated in FIGS. 3 to 6, the protection member 13 is disposed so that the through holes 24 for fitting the screw parts 33 formed in the curved part 23 of the housing 2 overlap with the through holes 136 formed in the protection member 13, and the protection member 13 is attached to the frames 21 and 22 and the curved part 23 of the housing 2 with the double-faced tape. Next, the screw parts 33 formed on the support member 3 is inserted into the through holes 136 for fitting the screw parts 33 formed in the protection member 13 and the through holes 24 for fitting the screw parts 33 formed in the housing 2 from the side of the front surface 135 of the protection member 13.

Furthermore, the support plate 5 and the fixing nuts 34 are disposed on the side of the rear surface of the housing 2, and the fixing nuts 34 are screwed to the screw parts 33.

Finally, the housing side surface cover 6 and the housing back surface cover 7 are disposed on the side surface and the back surface of the housing 2, respectively, to complete the display 100. Since the side surface cover 6 and the back surface cover 7 are disposed, a foreign material can be prevented from entering the display, thus stiffness in the housing 2 can be enhanced. A structure 4 may be appropriately disposed on a side of an upper surface of the support member 3 on the housing 2.

<Protection Member>

The protection member 13, which is disposed on the front surface of the first display panel 11 or the second display panel 12 for preventing the display panels 11 and 12 (or a touch panel when the touch panel described below is mounted) from damage, deformation, abrasion, and contamination, for example, due to external pressure and contact, is made of glass or a material containing glass, being transparent or substantially transparent. Glass which has high intensity and is hardly deformed is preferably used for the protection member 13. In the protection member 13 used in the present embodiment, the peripheral region except for the display regions of the display panels serves as a light-shielding region, however, a function as a design member can also be added to the peripheral region by performing printing and painting on the front surface or the rear surface thereof. Since the first display panel 11 of the present embodiment is disposed with curvature, it is curved along with the frame 21 of the housing 2. The protection member 13 is preferably a planar-shaped glass processed to have a thin plate shape, being thin enough to be freely curved, and has a plate thickness of 0.4 mm or smaller. When the protection member 13 having the thickness of approximately 0.4 mm is curved to have the curvature R100 or smaller, there is a high possibility of peeling of the protection member 13 due to reaction force. Thus, the stress on the peeling is reduced by using the protection member 13 having the thickness smaller than 0.4 mm. The above configuration enables the manufacture of the display 100 in which the first display panel 11 and the second display panel 12 attached to the planar-shaped protection member 13 are formed along with the design shape of the housing 2.

<Double-Faced Tape>

Preferably used as the double-faced tape to attach the protection member 13 and the housing 2 is a double-faced tape having cushioning characteristics and a thickness of approximately 1 mm so that it can reduce and follow bending stress of the protection member 13.

<Display Panel>

A plasma display panel, an organic EL panel, a liquid crystal display panel, or the like can be adopted as a display panel. Birefringent property of liquid crystal is applied to the liquid crystal display panel, and the liquid crystal display panel includes a first substrate in which a colored layer, a light-shielding layer, and an opposite electrode, for example, are formed on an insulating substrate such as glass and a second substrate in which a thin film transistor which is to be a switching element, and a pixel electrode, for example, are formed on an insulating substrate such as glass. A spacer for maintaining an interval between the first substrate and the second substrate, a sealing member for attaching the first substrate and the second substrate, a liquid crystal sandwiched between the first and second substrates, a sealant of an inlet through which the liquid crystal is injected, alignment film and polarizer plate for distributing light to the liquid crystal, and the like (not shown in the drawing) also constitute the liquid crystal display panel.

<Wiring Substrate>

The wiring substrates 111 and 121 are connected to the first display panel 11 and the second display panel 12, respectively, and a connector of a control substrate is connected to end portions of the wiring substrates 111 and 121 to input signals to display an image (not shown in the drawings).

<Backlight>

Each of the backlights 112 and 122 include a light source that emits light, a reflector that diffuses light, and an optical sheet, for example, and irradiates the first display panel 11 and the second display panel 12 from the side of the back surface.

<Touch Panel>

Each of the first display panel 11 and the second display panel 12 may be provided with a touch panel (not shown in the drawings) on the side of the display surface. The touch panel converts, using a circuit made up of a transparent electrode formed on a transparent substrate, information on a position coordinate being input from outside (an operator) into an electrical signal, and transmits, using an output wiring member, the electrical signal to a control circuit disposed in a finished product (not shown in the drawings). A projection capacitance type touch panel is used in many cases. In the projection capacitance type touch panel, coordinate data detects a position of a tip of an operator's finger, for example, and a proportion of a current amount of a plurality of electrode patterns between a contact position and a region around the contact position, thus the position of the finger is accurately determined and the signal is input. A transparent glass, for example, is applied to the substrates constituting the touch panel (not shown in the drawings).

According to the present invention, the above embodiments can be arbitrarily combined, or each embodiment can be appropriately varied or omitted within the scope of the invention.

What is claimed is:

1. A display, comprising:
   at least one display panel displaying an image;
   a protection member holding the at least one display panel from a side of a front surface;
   a housing supporting the protection member; and
   a support member, wherein
   the housing includes a frame and a curved part having a plurality of curvatures,
   the protection member is attached and fixed to a position facing the curved part of the housing,
   the support member includes a screw part protruding from a curved surface corresponding to the curved part of the housing toward a direction of the housing,
   each of the protection member and the housing includes a hole corresponding to the screw part in a position in which the screw part is disposed, and
   the housing and the protection member are fixed by the screw part.

2. A display, comprising:
   at least one display panel displaying an image;
   a protection member holding the at least one display panel from a side of a front surface; and
   a housing supporting the protection member, wherein
   the housing includes a frame and a curved part having a plurality of curvatures, and
   the protection member is attached and fixed to a position facing the curved part of the housing.

3. The display according to claim 2, further comprising a support member having a curved surface corresponding to the curved part of the housing, wherein
   the protection member is disposed between the support member and the curved part of the housing.

4. The display according to claim 2, wherein
   in the protection member, a thickness of a portion facing the curved part of the housing is smaller than that of a portion facing a portion other than the curved part of the housing.

5. The display according to claim 2, wherein
   the at least one display panel includes a plurality of display panels, and
   the plurality of display panels are disposed in portions except for the curved part of the housing, thereby being set to be directed to different display directions.

6. The display according to claim 2, wherein
   the protection member holds the at least one display panel to cover a peripheral region at a front side surface of the at least one display panel.

* * * * *